United States Patent [19]

Miyazaki et al.

[11] 4,423,239

[45] Dec. 27, 1983

[54] METHOD FOR PURIFYING AN EPOXIDATION PRODUCT

[75] Inventors: Kazuo Miyazaki, Yokohama; Hajime Hara, Fujisawa; Kojiro Teramoto, Kamakura; Hideo Horii, Tokyo; Humiaki Oshimi, Yokohama; Yoshihiko Araki, Tokyo, all of Japan

[73] Assignee: Nippon Petrochemicals Company, Limited, Tokyo, Japan

[21] Appl. No.: 426,061

[22] Filed: Sep. 28, 1982

[30] Foreign Application Priority Data

Oct. 21, 1981 [JP] Japan ................... 56-167058

[51] Int. Cl.³ ............................................. C07D 301/32
[52] U.S. Cl. ............................. 549/541; 549/542; 549/525; 549/526; 549/527
[58] Field of Search ............... 549/542, 541, 525, 526, 549/527

[56] References Cited

U.S. PATENT DOCUMENTS 3,222,381 12/1965 Iacoviello et al. .................. 549/542
3,701,767 10/1972 French et al. ....................... 549/542

*Primary Examiner*—Norma S. Milestone
*Attorney, Agent, or Firm*—Sherman & Shalloway

[57] ABSTRACT

In a method for purifying a crude epoxidation product of a liquid conjugated diolefin polymer or a vegetable oil which comprises the steps of adding an aqueous washing agent to a crude epoxidation product which is obtained by the reaction of a liquid conjugated diolefin polymer or a vegetable oil with an organic peracid or an epoxidizing agent capable of generating an organic peracid in situ, stirring the mixture, leaving the mixture to stand to induce phase separation and thereafter withdrawing the organic layer, the improvement wherein 50 to 300 parts by weight, per 100 parts by weight of the crude epoxidation product, of a 10–80% by weight aqueous solution of isopropanol is used as the washing agent.

3 Claims, No Drawings

METHOD FOR PURIFYING AN EPOXIDATION PRODUCT

This invention relates to a method for purifying an epoxidation product. More specifically, it relates to a method for purifying a crude epoxidation product obtained by the reaction of a liquid conjugated diolefin polymer or a vegetable oil with an organic peracid or an epoxidizing agent capable of generating an organic peracid in situ.

Epoxidized conjugated diolefin polymers or epoxidized vegetable oils are used as stabilizers or plasticizers for polyvinyl chloride resins, and also find extensive applications as a modifier for adhesives and paints. In addition, products obtained by reaction with compounds having active hydrogen such as inorganic acids, organic acids, phenols and amines by utilizing the reactive epoxy group of these epoxidation products find extensive use as paints, adhesives, surface-active agents, etc.

Such epoxidized conjugated diolefin polymers or epoxidized vegetable oils are produced by reacting liquid conjugated diolefin polymers or vegetable oils with epoxidizing agents. Generally, this reaction is carried out by two methods, one involving the use of an organic peracid as an epoxidizing agent, and the other involving the generation of an organic peracid in situ using aqueous hydrogen peroxide. Upon the completion of the epoxidation reaction, the reaction mixture contains the epoxidation product, the unreacted peroxide, an organic or inorganic acid, water, etc. When sodium sulfite or an alkali such as sodium hydroxide is added in order to decompose the unreacted peroxide or to neutralize the acids, the reaction mixture also contains the salt or the alkali.

Usually, the following procedures are taken in order to purify the epoxidized conjugated diolefin polymer or epoxidized vegetable oil in the reaction mixture. Where water is absent in the reaction mixture, the reaction mixture consisting mainly of the crude epoxidation product is repeatedly washed with water to remove the unreacted peroxide, the acid, the salt, etc. Sometimes, it is washed with an aqueous solution containing sodium sulfite or an alkali. Where the reaction mixture contains water, it is first left to stand to separate an aqueous layer containing the unreacted peroxide, the acid and the salt, and then washed with water. In the subsequent distilling step, a small amount of water or the solvent is distilled off from the washed epoxidation product. As a result, the desired pure epoxidation product is obtained.

The aforesaid method of epoxidation and the method of purifying the crude epoxidation product are described, for example, in Kirk-Othmer "Encyclopedia of Chemical Technology", 3rd edition, Vol. 9, page 251, and Japanese Patent Publications Nos. 3239/1958, 24726/1961, and 43878/1976.

The conventional method for purifying the epoxidation product, however, has the disadvantage that emulsification which is difficult to destroy occurs frequently during the washing step for the crude epoxidation product or during the step of separating the reaction mixture containing water into an oil layer and a water layer, and this emulsification tends to be more noticeable as the oxirane content of the epoxidation product increases. In an extreme case, the formation of an emulsion makes it totally impossible to separate and recover the epoxidation product. Even when the separation and recovery are possible, a considerable amount of the epoxidation product will get mixed with the waste water to reduce the yield of the epoxidation product. In addition, the washed epoxidation product is contaminated with a peroxide or an acid, reactions such as the polymerization of the epoxidation product or the ring-opening of the oxirane ring take place in the subsequent distilling step and cause undesirable changes in the properties of the resulting epoxidation product. Furthermore, the inclusion of even tiny amounts of salts or alkalies in the epoxidation product frequently exert serious influences on its performance when the epoxidation product is to be submitted to a subsequent reaction.

Accordingly, when such a difficulty-destroyable emulsion is formed, it is the practice to increase the number of procedures of washing the crude epoxidation product, or, if the reaction mixture contains water, to prolong the settling time for separation into an oil layer and a water layer. These measures, however, are time-consuming and economically disadvantageous.

The present inventors have made extensive investigations in order to solve the aforesaid problem, and discovered a method for obtaining an epoxidation product having uniform properties and a high purity easily from the epoxidation reaction mixture.

It is an object of this invention therefore to obtain an epoxidation product having a high purity and uniform properties easily from the epoxidation reaction mixture while inhibiting emulsion formation during purification of the crude epoxidation product.

According to this invention, there is provided, in a method for purifying a crude epoxidation product of a liquid conjugated diolefin polymer or a vegetable oil which comprises the steps of adding aqueous washing agent to a crude epoxidation product which is obtained by the reaction of a liquid conjugated diolefin polymer or a vegetable oil with an organic peracid or an epoxidizing agent capable of generating an organic peracid in situ., stirring the mixture, leaving the mixture to stand to induce phase separation and thereafter withdrawing the organic layer, the improvement wherein 50 to 300 parts by weight, per 100 parts by weight of the crude epoxidation product, of a 10–80% by weight aqueous solution of isopropanol is used as the washing agent.

According to the purifying method of this invention, an emulsion formed is destroyed within a very short period of standing in the separation of the epoxidation reaction mixture into an oil layer and an aqueous layer or in the step of washing the crude epoxidation product, and the oil layer can be separated clearly from the aqueous layer. In addition, the oil layer containing the epoxidation product scarcely contains the peroxide, the acids, the salts, the alkali, etc. The purifying method of this invention, therefore, can give an epoxidation product having a high purity and uniform properties. It also offers economical advantages in that the time required for settling can be shortened, the number of procedures of washing the crude epoxidation product can be decreased, and the operation of purifying the epoxidation product can be performed in a continuous manner.

The method for purifying the epoxidation product in accordance with this invention will be described below more specifically.

The liquid conjugated diolefin polymer, as used herein, denotes a homopolymer of a conjugated diolefin or a copolymer containing at least 50 mole% of units derived from a conjugated diolefin, which has a number average molecular weight of from 300 to 10,000. Illustrative of such a conjugated diolefin are 1,3-butadiene, isoprene and 1,3-pentadiene. Conjugated vinyl monomers copolymerizable with the conjugated diolefin, such as styrene or acrylate esters, may be cited as a comonomer for the conjugated diolefin copolymer.

The liquid conjugated diolefin polymer can be obtained by anionic polymerization of the conjugated diolefin, with or without a comonomer, in the presence of an alkali metal or an organometallic compound thereof as an initiator. Liquid conjugated diolefin polymers obtained by polymerization in the presence of a coordination anionic polymerization catalyst, or by telomerization in the presence of a radical initiator can also be used in the method of this invention. The conjugated diolefin polymers so obtained may be used in this invention whether they have 1,2-linkages, 1,4-linkages or mixtures thereof.

The vegetable oil, as referred to herein, denotes a semidrying oil or a drying oil, such as soybean oil, linseed oil, safflower oil, sunflower oil and corn oil.

The epoxidation reaction of the liquid conjugated diolefin polymer or the vegetable oil is generally carried out by using an organic peracid such as peracetic acid, perpropionic acid or perbenzoic acid as an epoxidizing agent, or by the action of an organic acid such as formic acid or acetic acid on aqueous hydrogen peroxide in the presence or absence of an acid catalyst such as sulfuric acid or a strongly acidic ion exchange resin to generate an organic peracid in situ. When formic acid is uesed as the organic acid, the acid catalyst is not necessary, and the action of aqueous hydrogen peroxide on formic acid gives performic acid in situ. and thus makes it possible to perform the epoxidation advantageously.

The amount of the organic peracid as an epoxidizing agent, and the amounts of hydrogen peroxide, the organic acid and the acid catalyst vary depending upon the amount of the oxirane group to be introduced into the liquid conjugated diolefin polymer or the vegetable oil and the reaction conditions. Generally, the following amounts are employed preferably.

(1) The equivalent ratio of the double bonds in the vegetable oil or the diolefin polymer to the organic peracid is 1:0.1–3.

(2) The equivalent ratio of the double bonds in the vegetable oil or the diolefin polymer to hydrogen peroxide is 1:0.1–3, and the equivalent ratio between hydrogen peroxide, the organic acid and the acid catalyst is 1:0.05–1.0:0–0.1.

The epoxidation reaction temperature is generally from 0° to 100° C., preferably from 20° to 70° C. Since the epoxidation reaction is an exothermic reaction, the organic peracid or aqueous hydrogen peroxide can be added, as desired, in order to remove the heat of the reaction advantageously. The time required for the reaction varies depending upon the reaction temperature and the desired oxirane content of the epoxidation product, and is usually from 1 to 10 hours.

The epoxidation reaction may be carried out in the absence of a solvent. If required, it can be carried out in the presence of a solvent inert to the epoxidizing agent, such as n-hexane, cyclohexane, n-heptane, benzene, toluene, xylene and chloroform.

Accordingly, the crude epoxidation product, as referred to in this invention, denotes not only an epoxidation product containing the unreacted peroxide and by-products obtained by reacting the liquid conjugated diolefin polymer or the vegetable oil with the epoxidizing agent in the absence of a solvent, but also the reaction mixture of the epoxidation product obtained by performing the epoxidation reaction in the presence of a solvent. The crude epoxidation product also denotes the deactivated reaction mixture obtained by treating the reaction mixture after the epoxidation with sodium sulfite, sodium thiosulfate, etc., or neutralizing it with sodium hydroxide.

The critical feature of the present invention is that the crude epoxidation product obtained by epoxidizing the liquid conjugated diolefin polymer or the vegetable oil by the aforesaid method is washed with a specified amount of an aqueous solution of isopropanol in a specified concentration.

When an organic peracid such as peracetic acid, perpropionic acid and perbenzoic acid is used as the epoxidizing agent, a crude epoxidation product containing the unreacted peroxide or an organic acid (the reaction mixture) is obtained upon the completion of the epoxidation reaction. In this case, the aqueous isopropanol solution is directly added to the reaction mixture to wash the reaction mixture. As a result, an epoxidation product having a high purity can be obtained without the formation of an emulsion during washing.

On the other hand, when the epoxidation reaction is carried out by the action of aqueous hydrogen peroxide on an organic acid such as formic acid or acetic acid in the presence or absence of an acid catalyst to generate an organic peracid in situ, water for diluting hydrogen peroxide or water generated by the decomposition of hydrogen peroxide exists in the reaction mixture. Hence, upon the completion of the epoxidation reaction, there is usually obtained a reaction mixture consisting of an oil layer composed of the crude epoxidation product and an aqueous layer containing the unreacted peroxide and the organic and/or inorganic acid. In this case, it is possible to leave the reaction mixture to stand, remove the aqueous layer by a usual method, add the aqueous isopropanol solution to the oil layer (i.e., the crude epoxidation product) and wash the crude epoxidation product. However, by washing the crude epoxidation product by directly adding the aqueous isopropanol solution to the reaction mixture, an epoxidation product having a higher purity can also be obtained while the formation of an emulsion during the separation of the reaction mixture into an oil layer and an aqueous layer is inhibited.

The concentration of the aqueous isopropanol solution added to the crude epoxidation product is 10 to 80% by weight, preferably 25 to 50% by weight. If the concentration is lower, the washing power of the solution is reduced; and if it is higher than the upper limit, difficulty is encountered in the separation of the oil layer from the aqueous layer. The amount of the aqueous isopropanol solution to be added is 50 to 300 parts by weight, preferably 70 to 200 parts by weight, per 100 parts by weight of the crude epoxidation product. If the amount is smaller than the lower limit, the washing power of the solution is reduced; and if it is larger than the upper limit, no further increase in effect is observed. When the crude epoxidation product, which is not treated with sodium sulfite or sodium thiosulfate or is not neutralized with sodium hydroxide, is used, sodium sulfite or an alkali such as sodium hydroxide may be added to the aqueous isopropanol solution in order to neutralize the acid or decompose the peroxide.

Instead of adding isopropanol in the form of an aqueous solution, it is possible to add isopropanol and water separately. The sequence of addition is optional.

The temperature at which the crude epoxidation product is washed with the aqueous isopropanol solution is not critical. It is usually 0° to 100° C., preferably 20° to 80° C. In the washing step, the time required for mixing the crude epoxidation product with the aqueous isopropanol solution is usually 3 to 60 minutes, preferably 10 to 30 minutes. The subsequent settling time is 5 to 180 minutes, preferably 10 to 60 minutes. These operations may be carried out batchwise or continuously.

The operation of mixing the crude epoxidation product with the aqueous isopropanol solution for washing and then leaving the mixture to stand is usually performed once or twice with good results. If required, however, it may be repeated three times or more to increase the purity of the epoxidation product further.

One typical operation in accordance with the method of this invention comprises epoxidizing the liquid conjugated diolefin polymer or the vegetable oil with an organic acid and hydrogen peroxide, adding an aqueous solution of isopropanol containing an alkali directly to the reaction mixture without removing an aqueous layer from the reaction mixture, then leaving the mixture to separate it into an oil layer and an aqueous layer, again adding an aqueous solution of isopropanol to the oil layer composed of the epoxidation product, stirring the mixture, leaving it to stand and removing the aqueous layer, thereby forming an epoxidation product free from the unreacted peroxide, the acid, the alkali and the inorganic salt.

The epoxidation product obtained by washing with an aqueous solution of isopropanol may be distilled by a known method in order to remove water and sometimes, the solvent. Thus, a purified epoxidation product may be obtained from the distillation bottom.

The following examples further illustrate the present invention specifically.

EXAMPLE 1

Butadiene was polymerized at 40° C. in an atmosphere of nitrogen in benzene using benzyl sodium as an initiator and toluene as a chain-transfer agent to give a liquid butadiene polymer having a number average molecular weight of 1770, a viscosity of 97 poises at 25° C. and a vinyl group content of 65% by weight.

250 g of the liquid butadiene polymer was taken into a 2-liter flask equipped with a reflux condenser, a dropping funnel and a stirrer, and 500 g of benzene and 11.0 g (10.24 moles) of 100% formic acid were charged into the flask. With stirring at 60° C., 75.0 g (1.33 moles) of 60% by weight aqueous hydrogen peroxide was added dropwise through the dropping funnel over the course of about 20 minutes. Then, the mixture was further stirred for 3 hours at 60° C.

After the reaction, 800 g of a 30% by weight aqueous solution of isopropanol containing 1% by weight of sodium sulfite was added to the reaction mixture, and the mixture was stirred at 60° C. for 3 minutes. When the mixture was left to stand, phase separation occurred in 2 to 3 minutes to form a clear oil layer and a clear aqueous layer. Thirty minutes after standing, the aqueous layer was removed, and 350 g of a 30% by weight aqueous solution of isopropanol was added to the oil layer. The mixture was again stirred at 60° C. for 30 minutes. On standing, this mixture immediately separated into an oil layer and an aqueous layer. Thirty minutes after standing, the oil layer was withdrawn, and analyzed. It was found that the amount of the remaining peroxide was 200 ppm (calculated as hydrogen peroxide) based on the epoxidation product, and the amount of formic acid remaining formic acid was 0.28% by weight based on the epoxidation product. Thus, the unreacted peroxide was removed almost completely, and 94% by weight of the charged formic acid was removed.

A part of the oil layer the evaporated by a rotary evaporator at 100° C. and 5 mmHg to remove water and the solvent. There was obtained an epoxidized butadiene polymer having an oxirane content of 4.1% by weight (as an oxygen content) and a viscosity of 720 poises at 25° C.

Washing with 350 g of a 30% by weight aqueous solution of isopropanol was repeated three times further to obtain an oil layer containing 101 ppm (calculated as hydrogen peroxide) of the peroxide and 97 ppm of formic acid based on the epoxidation product. When water and the solvent were removed from the oil layer by the same operation as above, there was obtained an epoxidized butadiene polymer having an oxirane content of 4.0% by weight and a viscosity of 720 poises at 25° C.

The above-mentioned results clearly demonstrate that the peroxide and formic acid remaining in the epoxidation product after the two washings of the crude epoxidation product with the aqueous isopropanol solution did not at all adversely affect the properties, such as the viscosity and the oxirane content, of the epoxidation product in the subsequent distilling step, and the two washings with the aqueous isopropanol solution produce a sufficient effect.

EXAMPLE 2

250 g of a liquid butadiene polymer obtained in the same way as in Example 1 was taken into a 2-liter flask equipped with a reflux condenser, a dropping funnel and a stirrer, and 500 g of benzene and 11 g (0.24 mole) of 100% formic acid were charged into the flask. With stirring at 60° C., 75.0 g (1.33 moles) of 60% by weight aqueous solution of hydrogen peroxide was added dropwise over the course of about 1 hour through the dropping funnel. The mixture was further stirred for 6 hours at 60° C. After the reaction, 600 g of a 40% by weight aqueous solution of isopropanol containing 10.6 g (0.26 mole) of sodium hydroxide was added to the reaction mixture, and the mixture was stirred at 60° C. for 30 minutes. When the stirring was stopped, phase separation immediately occurred. After standing at 60° C. for 1 hour, the oil layer was separated and analyzed. No formic acid was detected, and the amount of the remaining peroxide was 84 ppm (calculated as hydrogen peroxide) based on the epoxidation product.

Volatile materials were removed from the oil layer by distillation in the same way as in Example 1 to give an epoxidized butadiene polymer having an oxirane content of 5.2% by weight and a viscosity of 1120 poises at 25° C.

EXAMPLE 3

A 2-liter flask equipped with a reflux condenser, a dropping funnel and a stirrer was charged with 250 g of a liquid butadiene polymer obtained in the same way as in Example 1, 500 g of benzene and 22 g (0.48 mole) of 100% formic acid. With stirring at 60° C., 90 g (1.57 moles) of 60% by weight aqueous hydrogen peroxide was added dropwise through the dropping funnel, and the mixture was stirred for 8 hours at the same temperature.

After the reaction, 800 g of a 40% by weight aqueous solution of isoopropanol containing 20.0 g (0.50 mole) of sodium hydroxide was added, and the mixture was stirred at 60° C. for 30 minutes. The mixture was then left to stand at the same temperature for 1 hour. Phase separation occurred completely. The oil layer was separated, and volatile materials were evaporated from it by the same operation as in Example 1 to give an epoxidized butadiene polymer having an oxirane content 6.5% by weight and a viscosity of 3600 poises at 25° C.

EXAMPLE 4

The procedure of Example 3 was repeated except that toluene was used instead of benzene as the solvent for the epoxidation. The oil-water separating condition of the reaction mixture after washing with an aqueous solution of isopropanol was as good as in Example 3. An epoxidized butadiene polymer having an oxirane content of 6.4% was obtained.

Comparative Example 1

A liquid butadiene polymer was epoxidized under the same conditions as in Example 2. After the reaction, 600 g of water was added to the reaction mixture, and the mixture was stirred for 30 minutes at 60° C. The stirring was stopped, and the mixture was left to stand at the same temperature. After the lapse of 3 hours, the emulsion formed was not destroyed, and it was impossible to separate it into an oil layer and an aqueous layer.

EXAMPLE 5 and Comparative Examples 2 to 10

100 g of the reaction mixture obtained in Example 3 was taken into a separating funnel, and 100 g of a 40% aqueous solution (a mixture when the solvent did not dissolve in water) of each of the hydrophilic organic solvents shown in Table 1 was added. The mixture was shaken for 5 minutes, and left to stand at room temperature for 30 minutes. The state of separation was observed, and is shown in Table 1. The 40% aqueous solution also contained sodium hydroxide in an amount 1.1 equivalents per equivalent of formic acid contained in 100 g of the reaction mixture.

TABLE 1

| Run | Hydrophilic solvent | State of separation | Na content in the oil layer (wt ppm) |
|---|---|---|---|
| Example 5 | isopropanol | Completely separated. | Below 1 |
| Comp. Ex. 2 | ethanol | Completely separated; the oil layer cloudy | 20 |
| Comp. Ex. 3 | methanol | An aqueous layer, an emulsion layer and an oil layer formed | 45 |
| Comp. Ex. 4 | n-butanol | Completely separated; the oil layer cloudy | 28 |
| Comp. Ex. 5 | butyl Cellosolve | Completely separated; the oil layer cloudy | 38 |
| Comp. Ex. 6 | acetone | Completely separated; the oil layer cloudy | 35 |
| Comp. Ex. 7 | ethylene glycol | Not separated. | — |
| Comp. Ex. 8 | dioxane | Not separated. | — |
| Comp. Ex. 9 | tetrahydrofuran | Not separated. | — |
| Comp. Ex. 10 | diglyme | Not separated. | — |

The foregoing results show that isopropanol caused the perfect separation of the reaction mixture into an oil layer and an aqueous layer.

EXAMPLE 6

A 2-liter flask equipped with a reflux condenser, a dropping funnel and a stirrer was charged with 250 g of soybean oil having an iodine value of 135, 40 g (0.66 mole) of glacial acetic acid, 50 g of n-heptane and 5.0 g (0.05 mole) of 97% by weight sulfuric acid. 83 g (1.46 moles) of 60% by weight aqueous hydrogen peroxide was added dropwise at 60° C. over the course of 1 hour, and the reaction was continued at the same temperature for 6 hours. After the reaction, 600 g of a 40% by weight aqueous solution of isopropanol containing 32 g (0.80 mole) of sodium hydroxide was added to the reaction mixture, and the mixture was stirred at 60° C. for 30 minutes. The mixture was then left to stand at 60° C. for 1 hour. Several minutes after the starting of standing, the separation of the mixture into an oil layer and an aqueous layer was completed. Volatile materials were removed from the oil layer by the same method as in Example 1 to give an epoxidized soybean oil having an oxirane content of 6.6% by weight.

EXAMPLE 7

A 2-liter flask was charged with 250 g of SUMIKA OIL #150 (a liquid butadiene polymer manufactured by Sumitomo Chemical Co., Ltd.; 1,4-butadiene polymer with a number average molecular weight of 1750), 500 g of benzene and 22 g (0.48 mole) of 100% formic acid, and 90 g (1.57 moles) of 60% by weight aqueous hydrogen peroxide was added dropwise at 60° C. over the course of 1 hour. The reaction was continued at this temperature for 3 hours.

After the reaction, 600 g of a 40% by weight aqueous solution of isopropanol containing 20 g (0.50 mole) of sodium hydroxide was added to the reaction mixture, and the mixture was stirred at 60° C. for 30 minutes. Then, the mixture was left to stand at 60° C. for 1 hour. Complete phase separation occurred.

Volatile materials were removed by the same operation as in Example 1 to give an epoxidized butadiene polymer having an oxirane content of 6.3% by weight.

EXAMPLE 8

A 2-liter flask equipped with a reflux condenser, a dropping funnel and a stirrer was charged with 250 g of the same liquid butadiene polymer as used in Example 7, 40 g (0.66 mole) of glacial acetic acid and 5.0 g (0.05 mole) of 97% by weight sulfuric acid. At 40° C., 83 g (1.46 moles) of 60% by weight aqueous hydrogen peroxide was added dropwise over the course of 1 hour, and the reaction was continued at this temperature for 3 hours. After the reaction, 800 g of a 40% by weight aqueous solution of isopropanol containing 32 g (0.80 mole) of sodium hydroxide was added to the reaction mixture, and the mixture was stirred for 30 minutes at 40° C. On standing at 40° C. for 30 minutes, the mixture completely separated into an oil layer and an aqueous layer.

Volatile materials were removed from the oil layer in the same way as in Example 1 to give an epoxidized butadiene polymer having an oxirane content of 6.0% by weight.

EXAMPLE 9

A 2-liter flask equipped with a reflux condenser, a dropping funnel and a stirrer was charged with 250 g of a liquid butadiene polymer obtained in the same way as in Example 1, 500 g of benzene and 22 g (0.48 mole) of 100% formic acid. With stirring at 60° C., 90 g (1.57 moles) of 60% by weight aqueous hydrogen peroxide was added dropwise through the dropping funnel, and the mixture was stirred for 8 hours at the same temperature. After the reaction, an aqueous solution containing 21.2 g (0.53 mole) of sodium hydroxide, 15.8 g (0.10 mole) of sodium thiosulfate and 275 g of water was added, and the mixture was stirred at 60° C. for 15 minutes. Then 225 g of isopropanol was added, and the mixture was stirred at 60° C. for 5 minutes. The mixture was then left to stand at the same temperature for 10 minutes. Phase separation occurred completely. After the lapse of 1 hour, the oil layer was separated, and volatile materials were evaporated from it by the same operation as in Example 1 to give an epoxidized butadiene polymer having an oxirane content of 6.5% by weight and a viscosity of 3800 poises at 25° C.

What is claimed is:

1. In a method for purifying a crude epoxidation product of a liquid conjugated diolefin polymer or a vegetable oil which comprises the steps of adding an aqueous washing agent to a crude epoxidation product which is obtained by the reaction of a liquid conjugated diolefin polymer or a vegetable oil with an organic peracid or an epoxidizing agent capable of generating an organic peracid in situ, stirring the mixture, leaving the mixture to stand to induce phase separation and thereafter withdrawing the organic layer, the improvement wherein 50 to 300 parts by weight, per 100 parts by weight of the crude epoxidation product, of a 10-80% by weight aqueous solution of isopropanol is used as the washing agent.

2. The method of claim 1 wherein the organic peracid is peracetic acid, perpropionic acid or perbenzoic acid.

3. The method of claim 1 wherein the organic peracid is generated by reacting an organic acid with hydrogen peroxide in situ.

* * * * *